Jan. 9, 1951     F. G. WIKSTROM     2,537,386
FEEDING, CUTTING, AND TRANSFER MECHANISM
Filed June 12, 1948     5 Sheets-Sheet 1
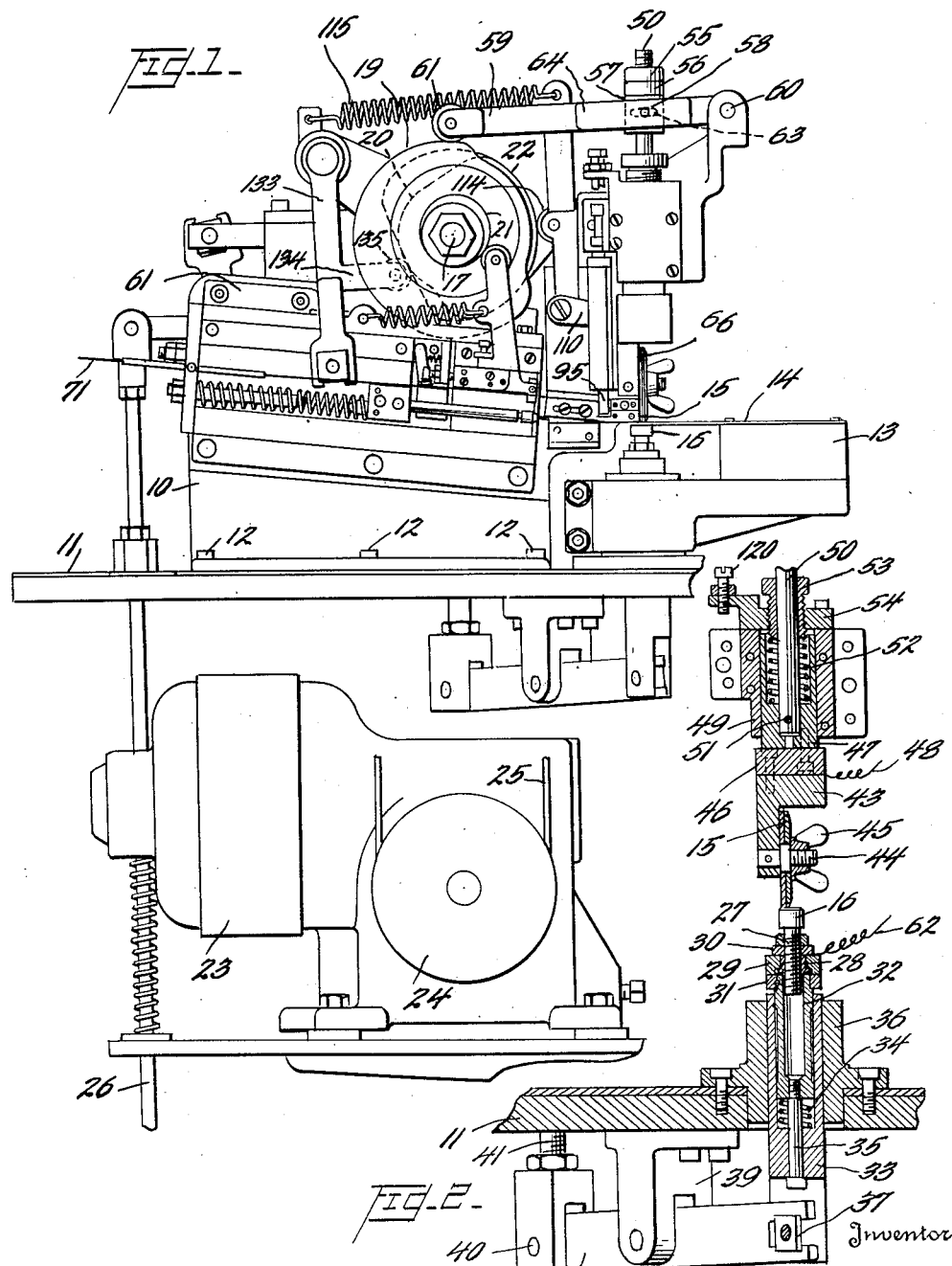
Frank G. Wikstrom,
By C. B. Hamilton
Attorney

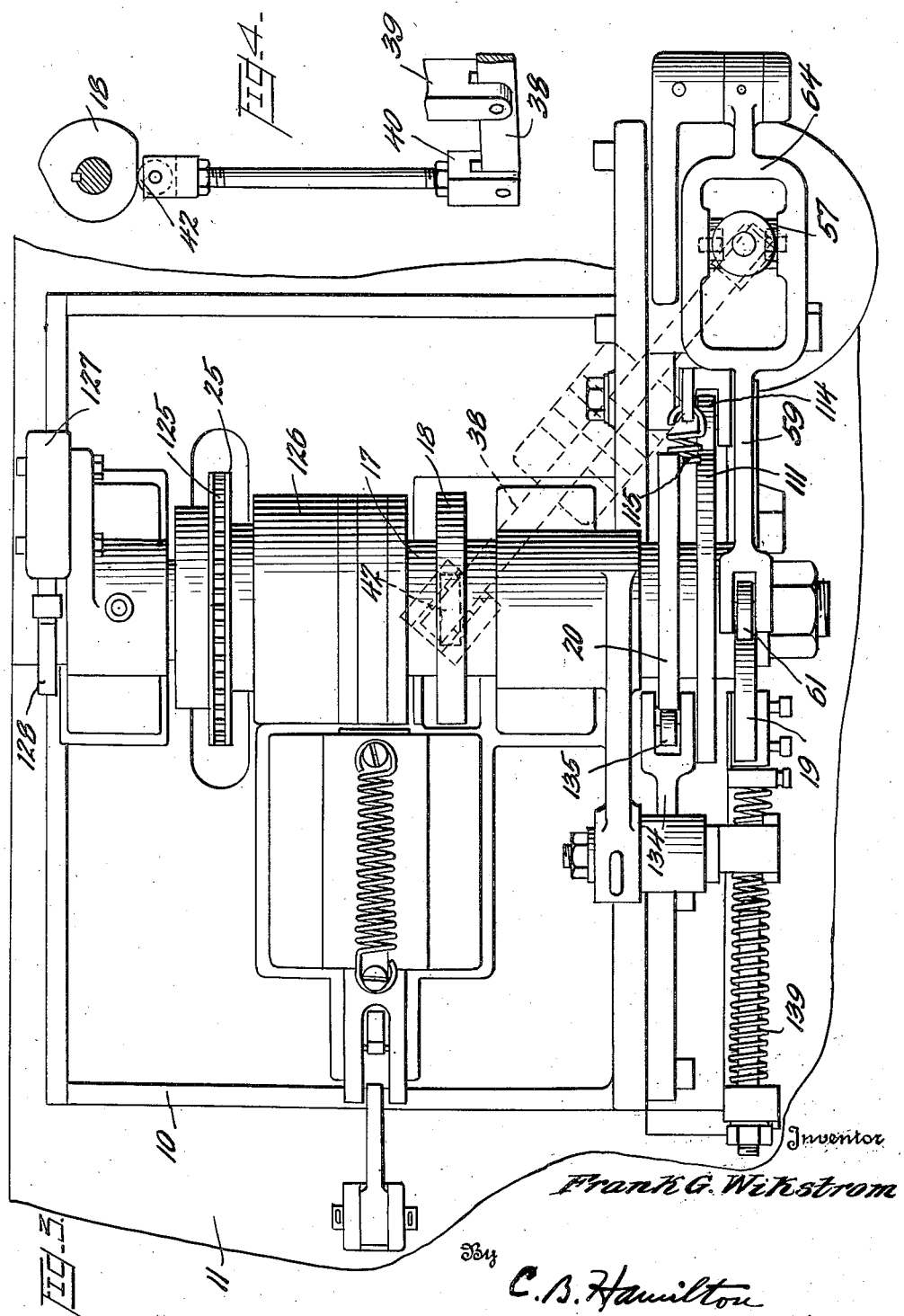

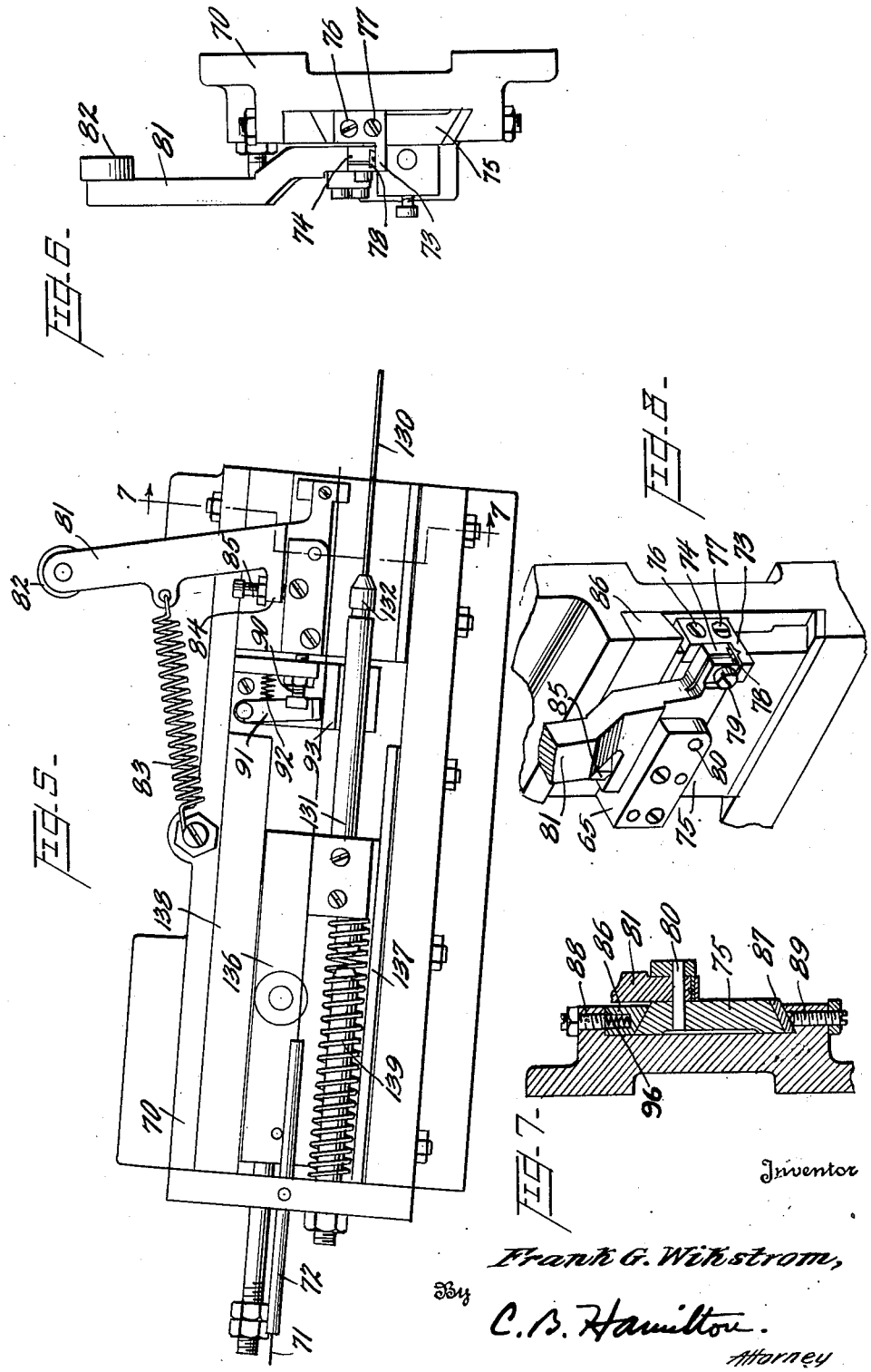

Jan. 9, 1951 F. G. WIKSTROM 2,537,386
FEEDING, CUTTING, AND TRANSFER MECHANISM
Filed June 12, 1948 5 Sheets-Sheet 4
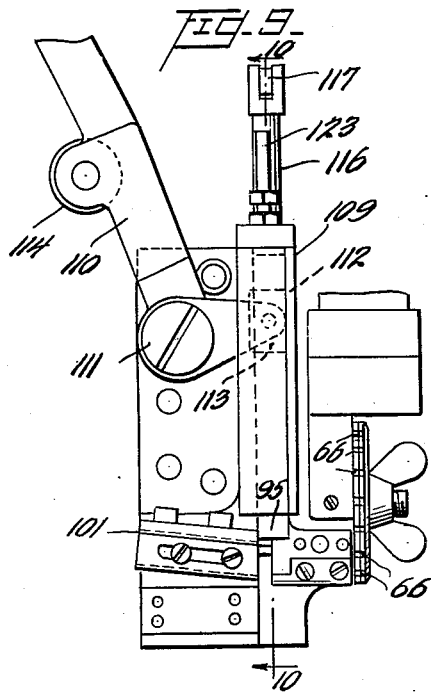
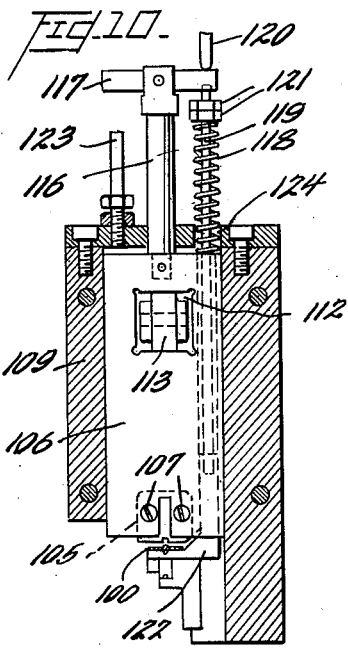
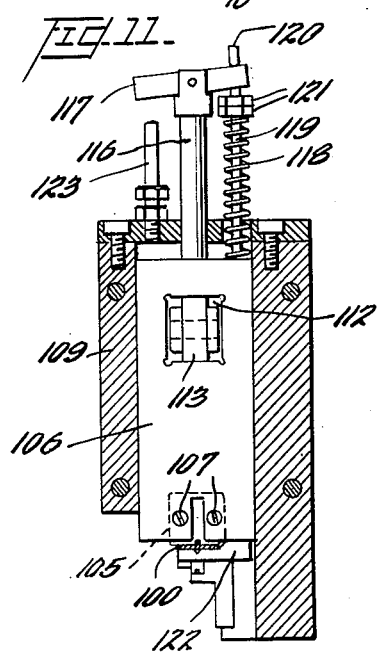
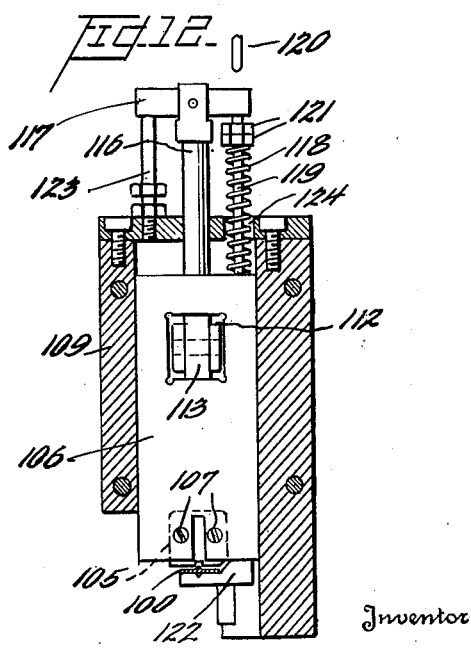
Inventor
Frank G. Wikstrom
By C. B. Hamilton
Attorney

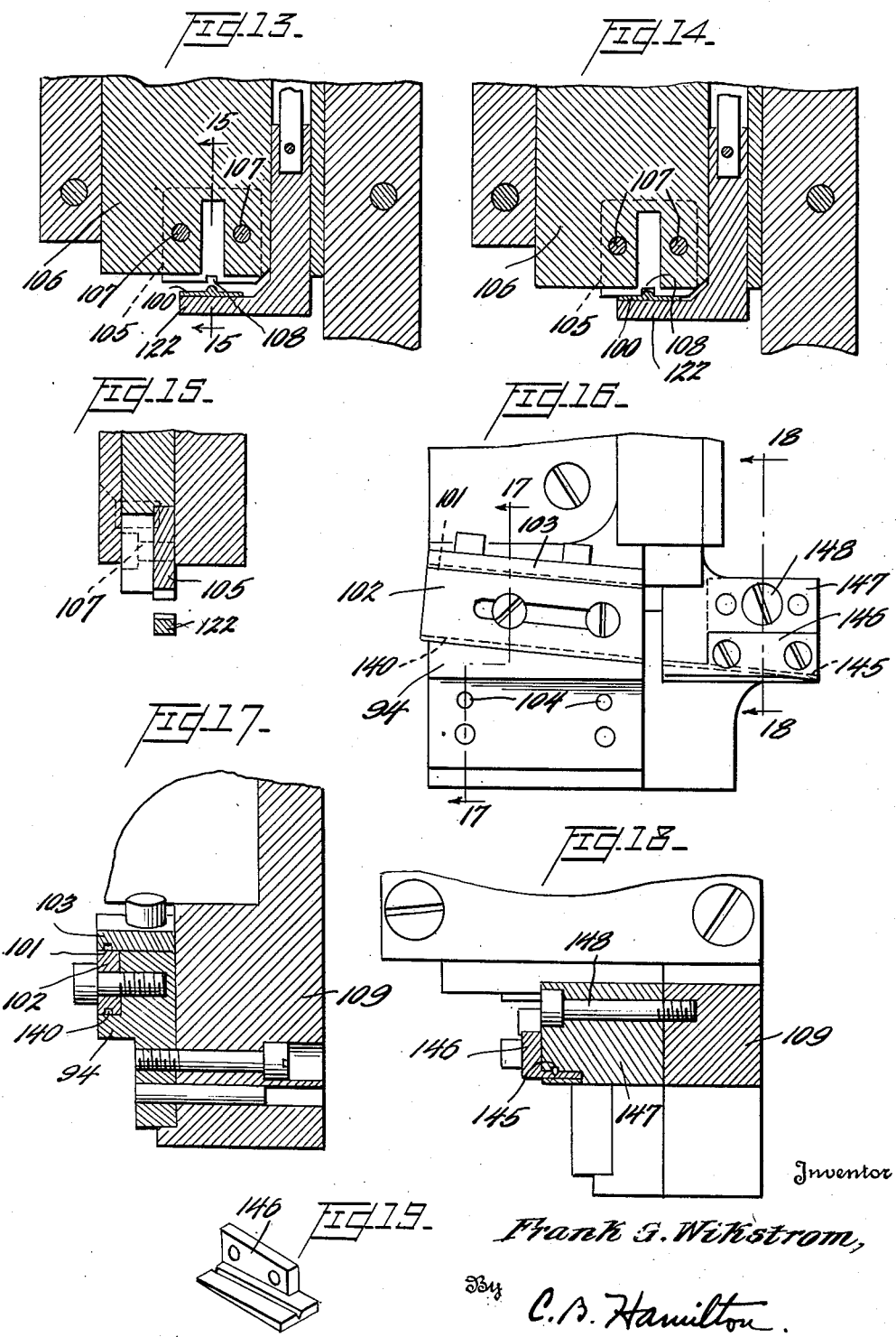

Patented Jan. 9, 1951                                                                 2,537,386

UNITED STATES PATENT OFFICE 2,537,386

FEEDING, CUTTING, AND TRANSFER MECHANISM

Frank G. Wikstrom, Valley Stream, N. Y., assignor to Western Electric Company, Incorporated, New York, N. Y., a corporation of New York Application June 12, 1948, Serial No. 32,665

13 Claims. (Cl. 164—48)

This invention relates to electric welding machines and more particularly to a machine for welding bimetallic contact elements to leaf springs for use in electromagnetic relays or other electrical apparatus.

This machine is described in greater detail and claimed in applicant's copending application, Serial No. 32,641 filed June 12, 1948.

In the manufacture of contacts to be used in electrical equipment, it is sometimes necessary to use gold, silver, palladium or other noble metals. Because the use of these precious metals involves considerable expense, it is desirable that these contacts be welded to less expensive metal in the form of leaf springs with a minimum of waste in a rapid and accurate manner.

An object of this invention is to provide an improved welding machine for welding contact elements to leaf springs, wherein contact element may be severed from a continuous length of stock, transferred to the welding position and welded in a uniform economical manner.

Another object of the invention is to provide an improved and efficient severing mechanism for producing contact elements from a continuous strip of stock material whereby the contact element will be severed and transferred to a position in advance of the welding electrodes in one continuous unidirectional movement of the severing mechanism.

In accordance with one embodiment of the invention, an electric welding machine for welding contacts to leaf springs is provided in which a continuous strip of contact material is advanced intermittently through a guide channel to a pair of vertically reciprocating jaws which are slidably mounted adjacent to a pair of welding electrodes. The upper jaw moves downward to grip a section of the strip between the jaws and then the jaws continue to move downward past the guide channel to sever a contact by shearing the advanced portion of the strip material against the lower edge of the guide channel. The jaws then continue in their downward movement to carry the severed contact into a position in advance of a pusher rod. There the jaws are partially separated and the pusher rod advances to deliver the contact to the welding position between an upper and lower electrode which are compressed against the leaf spring and the contact to weld these parts together and complete the operation.

Other features and advantages of the invention will become apparent from the following detailed description taken in conjunction with the accompanying drawings, in which:

Fig. 1 is a fragmentary front elevational view of a welding machine embodying the features of this invention;

Fig. 2 is an enlarged sectional view of the operating mechanism for the welding electrodes of the apparatus shown in Fig. 1;

Fig. 3 is a top plan view of the welding machine shown in Fig. 1;

Fig. 4 is a detailed perspective view of the operating linkage for the lower welding electrode shown in Figs. 1 and 2;

Fig. 5 is an enlarged detailed front view of the contact feeding and delivering mechanism of the apparatus shown in Fig. 1;

Fig. 6 is an end view of the feed mechanism shown in Fig. 5 looking from right to left;

Fig. 7 is a cross section taken on line 7—7 of Fig. 5 looking in the direction indicated by the arrows;

Fig. 8 is an enlarged fragmentary perspective view of the feeding mechanism of Fig. 5;

Fig. 9 is an enlarged front elevational view of the contact severing and transferring mechanism shown in Fig. 1;

Figs. 10, 11 and 12 are detailed vertical cross-sectional views taken on line 10—10 of Fig. 9 showing the various positions of the component members of the contact severing mechanism at the different stages of an operating cycle;

Figs. 13 and 14 are enlarged views of the gripping and severing jaws shown in Figs. 10 and 11;

Fig. 15 is a cross section taken on line 15—15 of Fig. 13 looking in the direction indicated by the arrows;

Fig. 16 is an enlarged detailed view of the lower portion of Fig. 9 showing the guide channels for the contact material;

Fig. 17 is a cross-sectional view taken on line 17—17 of Fig. 16 looking in the direction indicated by the arrows;

Fig. 18 is a cross-sectional view taken on line 18—18 of Fig. 16 looking in the direction indicated by the arrows; and Fig. 19 is a perspective view of the contact guide bracket shown in Fig. 18.

Referring now to the drawings, wherein like reference numerals designate the same parts throughout the several views, attention is first directed to Fig. 1 where the numeral 10 designates a housing or base for supporting the various parts and assemblies in their operative positions. The base 10 is securely mounted upon a table 11 by means of bolts 12. An adjustable fixture 13 of suitable contour is mounted on top of the table 11 for supporting a switch or leaf spring 14 or other electrical part on which a contact is to be welded. As shown in Fig. 1, the left end of the switch spring 14 projects beyond the fixture 13 into a gap between an upper welding electrode 15 and a lower welding electrode 16; these electrodes at the time of the positioning of the switch leaf spring upon the fixture being appreciably spaced apart for the purpose of facilitating the positioning of the spring. Although in the illustrated embodiment of the invention, the springs 14 are manually positioned on the fixture 13, suitable automatic means may be associated with the machine for automatically and intermittently feeding a train of leaf springs forward to the welding position in timed relation to the operation of the welding machine.

Journaled in the base 10 is a cam shaft 17 upon which are fixed rotatable cams 18, 19, 20, 21 and 22 which control the operation of the welding electrodes 15—16 and other various mechanisms in a predetermined sequence. An electric motor 23 has a driving pulley 24 for a belt 25 which drives a pulley 125 rotatably mounted on the rear end of the cam shaft 17.

Interposed between the driven pulley and the cam shaft is a conventional one revolution clutch 126 (Fig. 3) operated by momentarily depressing a foot pedal controlled rod 26 whereby the cam shaft and the cams thereon traverse through a single revolution. Upon completion of a single rotation of the cam shaft the clutch 126 is automatically disengaged to interrupt the drive to the cam shaft 17 to stop the rotation of the cams and the sequence of operations until the rod 26 is depressed again to repeat the cycle of operations.

The lower welding electrode 16 which is made of copper has formed integral therewith a threaded shank 27. This threaded shank is adjustably mounted in a bushing 28 positioned within a recess in an insulator block 29. The insulator block 29 is positioned between a conductor bar 30 and a collar 31, the latter being pinned to a hollow cylindrical slide 32. It is through this conductor bar 30 that electrical energy is supplied to the lower electrode during the welding operation. The cylindrical slide 32 is located in reciprocating relation within a recess of a sliding member 33. The sliding member 33 is mounted to reciprocate within a bearing member 36 which is rigidly secured to the table 11. A compressible spring 34 placed within the recess of sliding member 33 resiliently supports the slide 32. The relative movement between slide 32 and slide member 33 is limited by a shoulder screw 35 which passes through a longitudinal central aperture in slide member 33 and is threaded into positive engagement with the slide 32. The lower portion of sliding member 33 is bifurcated and a slidable block 37 is pivotally mounted therein. An operating arm 38, pivotally supported at its middle portion by a yoke 39, is bifurcated at both ends and one end is in operative engagement with the slidable block 37. The opposite end of this operating arm 38 is similarly mounted within a bifurcated block 40. A push rod 41 is secured to the block 40 and at the opposite end of the push rod is mounted a roller 42 (Figs. 3 and 4) so as to be in operative engagement with the cam 18.

The upper welding electrode 15 is secured to an offset member 43 by means of a stud 44 and a wing nut 45. The upper electrode has a series of peripheral notches 66 for receiving the contact to be welded and is rotatably adjustable on its support to permit proper alignment. The offset member 43 is secured to an insulator block 46 which in turn is secured to a recessed slide 47. A power lead 48 attached to the offset member 43 conducts current to the upper welding electrode. The recessed slide 47 extends through a bearing housing 49 and is longitudinally slidable therein. The bearing housing is fastened to the base 10. A push rod 50 extends through the recessed portion of the slide 47 and is secured thereto by means of a pin 51.

Also positioned within the recessed portion of the slide and surrounding the push rod 50 is a compression spring 52, the upper portion of which presses against a hollow plug 53. The hollow plug 53 is threaded into a stop support member 54 which is secured to the bearing housing 49. Thus while the upper electrode 15 is in its non-welding position, the compression spring 52 will continually exert a force tending to move the slide 47 and push rod 50 down. The upper end of the push rod 50 is threaded to receive adjusting nuts 55 and 56 (Fig. 1). Slidably mounted on the push rod is a collar 57 having a circumferential slot 63. A lever arm 59 has a split section 64 that surrounds the collar 57. Fixed to each side of the inner surface of this split section 64 is a pivot pin 58 which slides in the slot 63. Thus oscillatory motion of the lever arm 59 is imparted to the push rod 50 as reciprocatory motion. One end of the lever arm 59 is pivotally mounted at 60 on the housing 49. The opposite end of the lever arm 59 has mounted thereon a follower roller 61 which engages the cam 19 due to the action of the compression spring 52 on the push rod 50.

The mechanism for feeding and delivering a contact strip to a severing mechanism is supported on an elongated feeding mechanism frame 70 mounted on the base or housing 10. The contact metal is introduced into the machine in the form of a continuous strip or tape 71 of suitable cross section for satisfactory welding and electrical service. The strip may be bimetallic and is rolled or otherwise formed into the required cross section. As shown in Fig. 5, the strip 71 is drawn through a fixed cylindrical guide 72 by means of a feeding mechanism. Referring now to Figs. 5, 6 and 8, cooperating jaws 73 and 74 comprise a chuck for engaging and advancing the contact metal strip. The lower chuck jaw 73 is notched to correspond to the contour of the lower portion of the strip and is secured to a slide 75 by means of screws 76 and 77. The upper jaw 74 is bifurcated for the reception of a removable insert 78 which is notched to correspond to the contour of the upper portion of the contact metal strip 71. The insert 78 may be removed and another inserted when the contour of the contact metal strip is changed by merely loosening a holding screw 79. The upper jaw 74 is pivotally mounted on the slide 75 by means of a pivot pin 80 which passes through the bifurcated portion 65 of the slide 75 and the rear portion of the upper jaw. The upper jaw 74 comprises one end of a feed lever 81, the opposite end of this lever has mounted thereon a cam follower roller 82 which due to the action of a tension spring 83 attached thereto causes the roller to follow the peripheral contour of the cam 21 (Fig. 1). The feed lever 81 has formed integral therewith a heel 84. An adjustable screw 85 passes through the heel and bears against the upper portion of an outwardly projecting part of the slide 75 (Fig. 5). Thus by varying the position of screw 85, the effective distance that the upper jaw will pivot from the lower jaw can be varied. The slide 75 is supported and positioned for sliding movement by gibs 86 and 87 mounted in the frame 70 by means of screws 88 and 89. The upper gib 86 is pressed by a spring 96 (Fig. 7) against the slide 75. Adjustably mounted in a threaded section of the frame 70 is a slide limit screw 90 which abuts against the rear face of the slide 75 to limit the rearward motion thereof. By varying either of the adjustable screws 85 or 90, the effective motion imparted to feed the wire through the machine may be varied.

Depending from the frame 70 and pivotally supported thereon is a check arm 91 provided to hold the contact strip material 71 stationary during the return stroke of the feeding jaws 73—74. The strip material is in frictional engagement with the check arm 91 during the feeding operation, thus this check arm will pivot in a counterclockwise direction against the force of a spring 92 allowing the strip to be drawn forward during feeding. Upon completion of the forward feed of the strip, the check spring 92 returns the check arm to its initial position where the check arm wedges the contact strip material against a projecting section 93 of the frame 70 to prevent retrograde movement.

In feeding the contact material, an advanced portion 100 of the strip 71 is fed into a guide channel 101 (Figs. 16 and 17) formed by a pair of plates 102 and 103 mounted on a bracket 94, which is secured to a frame 109 by bolts 104. The frame 109 supports a severing mechanism 95 and is secured to the base 10. The guide channel 101 has the same cross section as the strip and guides the strip to the severing mechanism 95 as it is fed forward by the jaws 73—74.

The construction of the severing mechanism 95 is shown in Figs. 9 and 15 and the operation of the various parts thereof are illustrated in Figs. 10, 11, 12, 13 and 14.

An upper shear jaw 105 is removably secured to a vertically reciprocating slide 106 by means of screws 107. The upper shear jaw has a notch 108 (Figs. 13 and 14) therein to correspond with the upper cross-sectional contour of the contact strip. This jaw may be removed and replaced when worn or when the cross-sectional contour of the contact strip is changed. The reciprocating slide 106 is positioned for vertical sliding movement within the fixed frame 109 which is secured to the base 10. An L-shaped rocker 110 pivotally mounted by a screw 111 to the frame 109 has one arm extending into a slot 112 in the vertically reciprocating slide 106. At the end of this arm there is pivotally mounted a block 113 longitudinally slidable within the slot 112 thus when the rocker 110 is oscillated, the motion imparted to the slide 106 will be a reciprocatory movement in a vertical plane. Mounted on the middle portion of the other arm of the rocker 110 is a cam follower roller 114. A spring 115 (Fig. 1) secured at one end to the base 10 and at the other end to the rocker arm 110 insures the engagement of roller 114 with the peripheral face of the cam 22. Thus displacement of the roller 114 by the rotating cam 22 will oscillate the L-shaped rocker 110 about its pivot 111, simultaneously causing the block 113 to slide in the slot 112 and to reciprocate the slide 106 in the stationary frame 109 in accordance with the peripheral contour of rotating cam 22.

Secured in the upper part of the slide 106 is an upright stud or bracket 116 upon which is pivotally mounted a rocker arm 117. In the inoperative or normal position as shown in Fig. 10 the rocker arm 117 is held in a horizontal position by a spring biased rod 119 pressing against the rocker arm. Counterclockwise rotation of the rocker arm 117 is prevented by means of a stop 120 secured to the stop support member 54 (Fig. 2). The rod 119 passes through an aperture 124 in the upper surface of frame 109 and is maintained in its uppermost position by means of the spring 118 acting between an adjustable collar 121 and the upper surface of the slide 106. Secured to the lower end of the rod 119 is a lower cutter jaw 122. A fixed stop 123 is secured to the upper face of the frame 109 for the purpose of engaging and causing the rocker arm 117 to pivot upon downward movement of slide 106.

After the contact section to be welded has been severed from the contact strip 71 the severing jaws 105—122 transfer this contact to a position in advance of a delivery rod 130. As shown in Fig. 5 this delivery rod is secured to a reciprocating plunger 131 by means of a collet 132. The plunger 131 is secured to a sliding block 136 which is slidably positioned within the frame 70. The block 136 is reciprocated by means of an oscillating arm 133 (Fig. 1) pivotally secured to the base 10. Intermediate the ends of the arm 133 and rigidly secured thereto is an arm 134 having rotatably mounted thereon a cam follower roller 135 which rides against the peripheral surface of cam 20. Tending to force the block forward along the longitudinal guide members 137 and 138 is a compression spring 139 (Fig. 5). The forward section of the thin flexible delivery rod 130 acts through a lower guide channel 140 (Figs. 16 and 17) formed between the plates 102 and 94 and is accurately aligned with the gap between the severing jaws when they are in their lowermost position.

Positioned to the right of the reciprocating severing jaws and intermediate the welding position as shown in Fig. 16 is a delivery channel 145 formed between a bracket 146 (Figs. 18 and 19) and a guide block 147. The guide block 147 is secured to a continuation of the slide frame 109 by means of a screw 148.

In operating the apparatus, a switch leaf spring 14 or other electrical part is placed upon the fixture 13 with its left end extending between the upper and lower welding electrodes 15 and 16. The strip of contact material 71 is introduced into the machine from a supply reel (not shown) through the fixed cylindrical guide 72 and the feed jaws 73 and 78 to a position adjacent the severing jaws.

The operating cycle is then initiated by depressing the operating rod 26 to cause the one way clutch 126 to engage the cam shaft with the driving means thus causing the various cams to rotate and actuate the various mechanisms in timed sequence.

Rotation of the cam shaft 17 first moves the feed lever 81 about its pivot 80 to grip the contact material 71 between the insert 78 and the lower feed jaw 73. Continued movement of the feed lever by the cam causes the feed lever 81 to move the slide 75 forward to feed the strip material 71 to the severing mechanism 95.

After the feeding mechanism has completed its forward motion the feed jaws 73 and 74 are returned to their initial position. During this movement, retrograde motion of the contact strip material 71 is prevented by the check arm 91 being forced against the contact strip by the combined action of the spring 92 and the wedging effect caused by the contact strip material tending to rotate the check arm against the stop 93.

The advanced portion of the contact strip material 71 is fed into the gap between the upper and lower severing jaws 105 and 122 as shown in Fig. 10. The jaws 105 and 122 are held apart because counterclockwise rotation of the rocker arm 117 is prevented by the stop 120; thus the spring biased rod 124 bearing against the rocker arm 117 is prevented from rising and carrying the lower jaw 122 into engagement with the upper jaw 105.

Initial downward motion of the reciprocating slide 106 causes the rocker arm 117 to slightly pivot in a counterclockwise direction and simultaneously the upper jaw 105 slides into engagement with the contact strip material 71 and grips it against the lower jaw 122. The material now securely grasped by the jaws 105 and 122 is severed from the strip 71 by the shearing action of the jaws 105 and 122 moving past the edge of the guide channel 101.

The downward movement of the severing jaws 105 and 122 continues, transferring the severed contact to a position in alignment with the delivery rod 130 (Fig. 12). While the downward movement of the severing jaws is continuing, the rocker arm 117 follows along with the slide 106 as shown in Fig. 11 until the rocker arm strikes stop member 123 to cause the jaws 105 and 122 to separate upon reaching the lower delivery position as shown in Fig. 12. The separation of the severing jaws 105 and 122 in a lower position is not as great as that in the initial starting position; thus the severed contact is prevented from getting out of alignment during the transfer from the jaws 105 and 122 to the guide channel 145. The delivery rod 130 advances the severed contact from the position between the jaws through the guide channel 145 and onto the leaf spring 14 in the welding position.

As the delivery rod is withdrawn, the upper and lower welding electrodes 15 and 16 are brought into engagement with the severed contact and the leaf spring 14. The contact is tightly pressed against the leaf spring due to the action of the resiliently mounted electrodes.

Welding current is then introduced to the electrodes from a suitable source through flexible leads 48 and 62 and controlled by a switch 127 operated by a cam 128 (Fig. 3) on the cam shaft 17. The welding circuit is not shown for the sake of simplifying the disclosures but any well known suitable circuit can be used for supplying and controlling the welding current.

It is to be understood that the above described embodiment of the invention is simply illustrative of the application of the principles of the invention. Numerous other arrangements and modifications may be readily devised by those skilled in the art which will embody the principles of the invention and fall within the spirit and scope thereof.

What is claimed is:

1. A strand severing and feeding device, a straight line guide channel for guiding a strand, means for feeding the strand through said channel, a shearing edge transverse to the guide channel, gripping means adapted to cooperate with the shearing edge to shear the strand, means for imparting a translatory movement to said gripping means to grip said strand as it emerges from the guide channel and for moving the said gripping means past the shearing edge to cut the strand and continue movement thereof in the same direction until the gripping means is advanced to a predetermined position, means operated by the movement of the gripping means for partially releasing the gripping means at said position, and means for transferring the cut portion of the strand from said gripping means.

2. In a mechanism for cutting a section from metal stock, a base, a first jaw slidably mounted in the base, a second jaw slidably mounted within the first jaw, resilient means for normally holding the jaws in gripping engagement with the stock, a member for guiding the metal stock and having a shearing edge for cooperating with the jaws, means for moving the first and second jaws into gripping engagement with the stock and for moving the jaws past said shearing edge to shear a section from the stock, and means at each end of the movement of the jaws for overcoming the resilient means to release said jaws.

3. In an apparatus for severing and feeding strand material, a shearing member, a housing, a first jaw slidably mounted therein, a second jaw spaced from the first jaw and slidably connected thereto, said first and second jaws adapted to cooperate with the shearing member to sever the strand material, resilient means for normally holding the jaws in gripping engagement, means for advancing the strand material intermittently past the shearing member and into the jaws, means for moving the jaws into gripping engagement with the advanced strand material and to move said jaws past the shearing member to sever the advanced material and deliver it to a discharge position, means at each end of the movement of the jaws for overcoming the resilient means to release said jaws, and means for discharging the material from the jaws at said discharge position.

4. In a mechanism for feeding and severing strand material, a fixed guide channel having a shearing edge transverse to the channel, a first vertically reciprocating jaw, a second jaw spaced from the first jaw and slidably connected thereto, said first and second jaws adapted to cooperate with the shearing edge to shear the strand material, a resilient means for normally holding the jaws in gripping engagement, a discharge member, means for advancing the strand material through the guide channel and in between the jaws, means for moving the first and second jaws in a vertical plane into gripping engagement with the strand material and for moving the gripped material past the shearing edge to sever a section of the material, said movement in a vertical plane advancing the severed section of material to a position in advance of the discharge member, means at each end of said movement of the jaws in the vertical plane for overcoming the resilient means to release said jaws, and means for actuating the discharge member to transfer the severed material away from the jaws.

5. In an apparatus for severing sections from a strip of material, a frame, a shearing member mounted on the frame, a jaw slidably mounted on the frame, a second jaw positioned in slidable relation with said first jaw, said first and second jaws adapted to cooperate with the shearing member to shear the strip of material, means to intermittently feed the strip material between the jaws, means to slidably move the first jaw toward the second jaw to grip said strip material and to move said gripped strip material past the shearing member to sever a section from the strip, and means operated by the continuing movement of the jaws beyond the shearing member to separate the jaws upon completion of the continuing movement.

6. In a severing mechanism, a frame, a first sliding jaw positioned therein, a second jaw slidably positioned in said frame and in translational sliding relation with the first jaw, a shearing member positioned adjacent the jaws, said first and second jaws adapted to cooperate with the shearing member to shear a strip of material, resilient means for normally holding the jaws in gripping engagement, means to intermittently feed the strip material between the jaws, means for moving the first jaw toward the second jaw to grip a section of the strip material and for moving the first and second jaws past the shearing member to sever the gripped section of material, a pivoted member secured to the first jaw, and a stop secured to the frame and engaged by the pivoted member upon continued movement of the jaws to overcome the resilient means to separate the jaws.

7. In an apparatus for severing strand material, a frame, a pair of jaws slidably positioned therein, a shearing member secured adjacent the frame, means for moving said jaws into gripping engagement with the material and past the shearing member in motion of translation to sever a section of strand material, an arm pivotally secured to one of said jaws, and means secured to the frame and engaging said arm upon continuing movement of the jaws for pivoting said arm to impart translatory movement to one of said jaws to separate the jaws.

8. In an apparatus for severing strand material, an upper gripping member, a lower gripping member, a shearing element positioned adjacent the gripping members, said gripping members adapted to cooperate with the shearing element to shear the strand material, means for intermittently feeding a section of strand material over the shearing element and between the gripping members, means for moving said gripping members to grip a section of the strand material and for moving the gripped section of material past the shearing element to sever the section from the strand, a pivoted arm secured to said upper gripping member, and means secured to the frame and engaging said arm during continued movement of the gripping members for moving said arm about its pivot to impart translatory movement to the lower gripping member to separate said lower member from said upper member.

9. In a strand feeding and severing apparatus, a frame, an upper gripping jaw and a lower gripping jaw slidably mounted within said frame, a rod secured to said lower jaw and slidably positioned within the upper jaw, an operating arm secured to said upper jaw, a fixed guide channel juxtapositioned to said jaws when in their normal open position, means for intermittently advancing the strand between the jaws while in their normal open position, means for moving said upper jaw toward said lower jaw to grip the material therebetween and for moving the jaws and gripped material past the guide channel to shear the strand at the juncture between the fixed guide channel and the sides of the jaws, means secured to the frame for engaging the operating arm at a predetermined position whereupon the operating arm engages the rod to separate the jaws, and a reciprocating member aligned with the predetermined open position of the jaws for moving the sheared strand through the jaws.

10. In a strand feeding and severing apparatus, a base, a pair of relatively slidable jaws, a fixed guide mounted on said base adjacent said jaws and having a passageway for a strand, means for intermittently advancing the strand through the guide passageway and into the jaws, means for sliding the jaws to grip the strand and shear the advanced portion of the strand at the juncture of the guide and the jaws, means for carrying the jaws downwardly to transfer the severed strand portion to a predetermined position, an arm pivotally secured to one of said jaws and in engagement with the other of said jaws, said arm being pivoted by the downward movement of said one jaw to separate the jaws at the predetermined position, and advancing means aligned with said predetermined position of the jaws for pushing the sheared strand therethrough.

11. In a strand feeding and severing device, a base, a pair of relatively movable jaws slidably mounted therein, a plurality of detachable plates mounted on the base forming a channel for guiding a strand to the jaws, means for intermittently advancing the strand through the channel and between the jaws, means for sliding the jaws to grip and shear the advanced portion from the strand at the juncture of the guide channel and the jaws, means for carrying the jaws downward to transfer the severed section to a predetermined position, means operated by the downward movement of the jaws to partially open the jaws at the lower predetermined position, a reciprocating member aligned with the said predetermined position of the jaws for moving the strand through the jaws.

12. In combination in a severing mechanism, a frame, a pair of gripping jaws slidably positioned therein, a rod slidably positioned within one of the jaws and attached to the other jaw, means for intermittently feeding a strip of material to said jaws, a shearing member positioned adjacent the jaws, said jaws adapted to cooperate with the shearing member to shear the strip material, means for sliding said jaws together to grip a section of the material and for moving the jaws and gripped material past the shearing member to shear said gripped section from the strip material, an arm pivotally secured to one of said jaws and in engagement with the rod, and means engaged by the arm during the sliding movement of the jaws for pivoting said arm to move the rod for separating the jaws upon continued movement.

13. In a mechanism for severing strand material, a stationary guide frame, a first jaw slidably positioned within the frame, a rod slidably mounted within the first jaw, a second jaw secured to the rod and positioned to cooperate with the first jaw, a pivoted actuator mounted on the first jaw and engaging the rod, resilient means for urging the rod against the actuator, a stop member secured to the frame for holding the actuator stationary to hold the rod in position to hold the lower jaw spaced from the upper jaw, means for intermittently feeding sections of the strand material between the open jaws, a shearing member, means for moving the first jaw toward the second jaw to engage the section of material between the jaws and for moving said jaws past the shearing member to sever the section and deliver it to a predetermined position, and a second stop member secured to the frame for pivoting the actuator to move the rod against the force of the resilient means to separate the jaws upon arrival of the jaws at the predetermined position.

FRANK G. WIKSTROM.

REFERENCES CITED

The following references are of record in the file of this patent:

UNITED STATES PATENTS

| Number | Name | Date |
| --- | --- | --- |
| 488,659 | McCool et al. | Dec. 27, 1892 |
| 601,593 | Shuster | Mar. 29, 1898 |
| 771,752 | Stafford | Oct. 4, 1904 |
| 2,105,387 | Wilcox #2 | Jan. 11, 1938 |
| 2,318,825 | Wilcox #1 | May 11, 1943 |
| 2,333,158 | Dowd | Nov. 2, 1943 |